United States Patent
Elad et al.

(10) Patent No.: US 9,634,496 B2
(45) Date of Patent: Apr. 25, 2017

(54) POWERING UP A WIRELESS POWER RECEIVING DEVICE

(71) Applicant: INTEL IP CORPORATION, Santa Clara, CA (US)

(72) Inventors: Yuval Elad, Petach-Tikva (IL); Shahar Porat, Geva Carmel (IL); Zeev Oster, Modiin (IL); Siva Ramakrishnan, Beaverton, OR (US); Reed D. Vilhauer, Portland, OR (US); Brian A. Leete, Beaverton, OR (US); Yuval Bachrach, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/866,617

(22) Filed: Sep. 25, 2015

(65) Prior Publication Data

US 2017/0090537 A1    Mar. 30, 2017

(51) Int. Cl.
*H02J 5/00* (2016.01)
*G06F 1/26* (2006.01)
*G06F 1/32* (2006.01)

(52) U.S. Cl.
CPC .............. *H02J 5/005* (2013.01); *G06F 1/266* (2013.01); *G06F 1/3212* (2013.01)

(58) Field of Classification Search
CPC ......... H02J 5/005; G06F 1/266; G06F 1/3212
See application file for complete search history.

(56) References Cited

U.S. PATENT DOCUMENTS

| | | | |
|---|---|---|---|
| 2013/0063082 A1* | 3/2013 | Lee | H02J 7/025 320/108 |
| 2014/0111153 A1* | 4/2014 | Kwon | H02J 7/025 320/108 |
| 2015/0229135 A1 | 8/2015 | Porat et al. | |
| 2015/0372496 A1* | 12/2015 | Lee | H02J 50/40 307/104 |
| 2016/0020649 A1* | 1/2016 | Bell | H02J 17/00 307/104 |

* cited by examiner

*Primary Examiner* — Stefan Stoynov
(74) *Attorney, Agent, or Firm* — International IP Law Group, P.L.L.C.

(57) ABSTRACT

Techniques for powering up a wireless power receiving device are described herein. An example computing device includes a power receiving unit to wirelessly receive power from a power transmitting unit. The platform hardware includes a System on a Chip (SoC), a multicomm device, and a power sequence manager. The multicomm device is for wireless communication with two or more communication standards. One of the communication standards is used as a side channel for communicating with the power transmitting unit. The power sequence manager component manages activation of platform components of the platform hardware during a low battery cold boot condition. Upon detecting wireless power, the multicomm device is configured to automatically activate and the power sequence manager component is to suppress activation of other platform components of the platform hardware.

25 Claims, 6 Drawing Sheets

100

POWERING UP A WIRELESS POWER RECEIVING DEVICE

TECHNICAL FIELD

This disclosure relates generally to techniques for wireless charging. Specifically, this disclosure relates to techniques for powering up a wireless power receiving device suitable for low battery or device-off conditions.

BACKGROUND ART

A basic wireless charging system may include a wireless power transmitter unit (PTU) and a wireless power receiving unit (PRU). A PRU may be implemented in a mobile computing device, such as a laptop, tablet or smart phone, which can be placed on a charging mat equipped with a PTU. The PTU may include a transmit (Tx) coil and a PRU may include a receive (Rx) coil. The Tx and Rx coils may be referred to as induction coils. In typical induction chargers the Tx coil creates an alternating electromagnetic field and the Rx coil takes power from the electromagnetic field and converts it back into electrical current to charge the battery and/or power the device. The two induction coils in proximity combine to form an electrical transformer.

The charging session handshaking between the PRU and the PTU is implemented over a side communication channel, such as a Bluetooth Low Energy link (BLE). When a charging session starts, the PTU sends power beacon pulses intended to provide the PRU with sufficient energy to turn on the side channel circuitry and send advertisement packets to the PTU. These beacon signals are short, and have limited amount of power to turn on the side channel circuitry.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
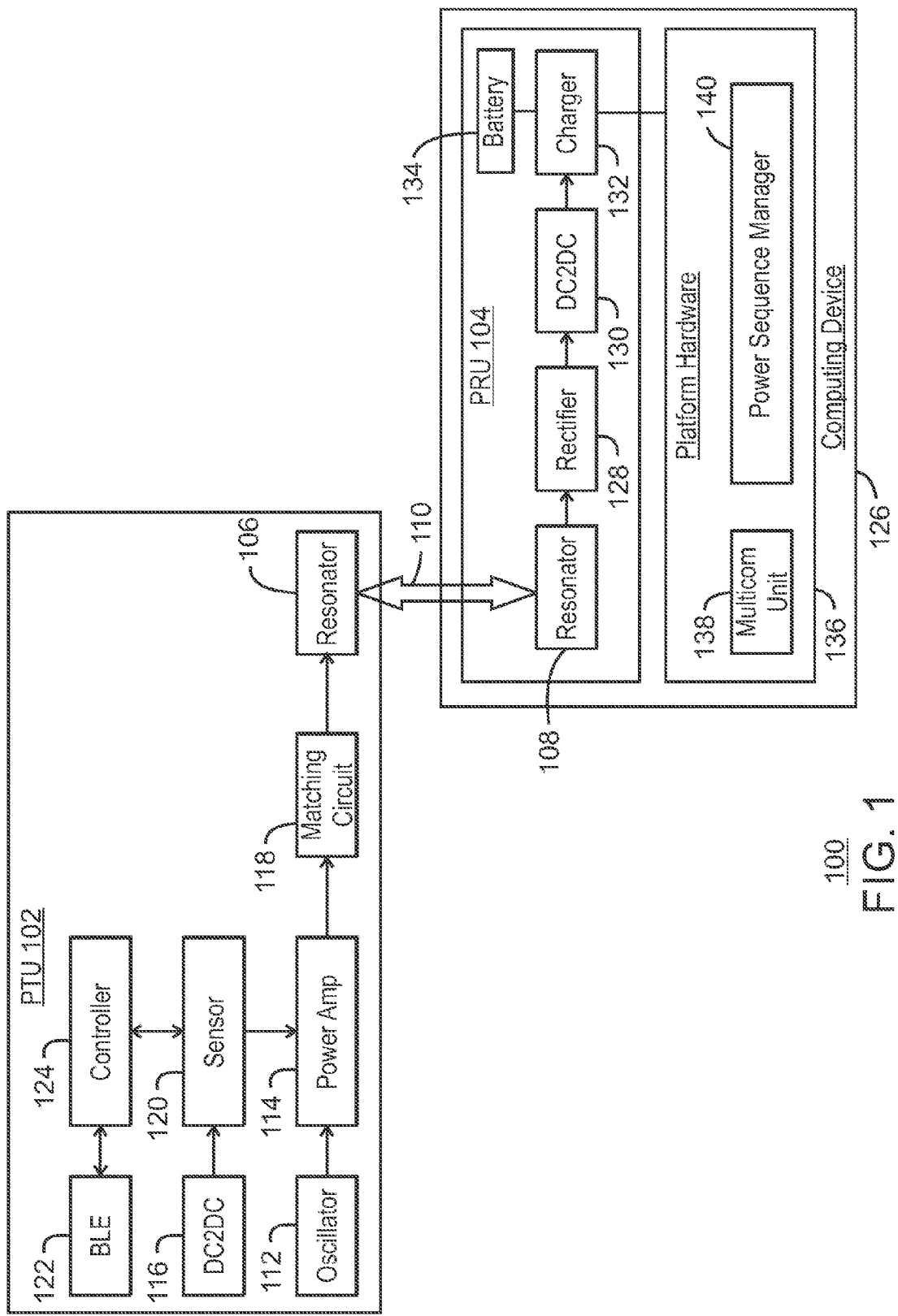
FIG. 1 is block diagram of a PTU to provide power to a PRU.

The present disclosure relates generally to techniques for wireless charging. More specifically, the techniques described herein provide techniques for wirelessly charging a device that may have low battery or dead battery and may be powered off. As mentioned above, the charging and/or powering session between the PRU and the PTU is implemented over a side communication channel, such as a Bluetooth Low Energy link (BLE), which can be powered by power beacon pulses sent by the PTU. If a device is powered off, for example, due to a depleted battery, placing the device in the vicinity of the PTU may cause the device to power back on. However, if the battery is low and the device is powered up, the device may not have enough power to support all of the device components in addition to the side channel circuitry. Communications between PRU and PTU through the side channel circuitry could therefore be impeded.

One possible solution is to provide a dedicated Bluetooth chip that is used only for wireless charging. The dedicated Bluetooth chip is powered by the beacons and sends the Bluetooth advertisement, but does not participate in other general Bluetooth communication functions. Other Bluetooth communication functions such as a hands-free headset or input device like a keyboard are performed by an additional general-purpose Bluetooth device or Multicomm device. Accordingly, this solution involves the addition of duplicate Bluetooth circuitry to the device, including an additional Bluetooth chip and the supporting peripherals, such a clocking circuitry and Bluetooth antenna. Another possible solution is to leverage the multicomm device for wireless charging and supply power to it from a dedicated power rail that is active during wireless charging boot and inactive during normal operation. Such a rail however complicates the power delivery scheme of both the platform and the multicomm device and adds burden to connector form factors and silicon pinouts.

The present disclosure describes a technique wherein the computing device's Multicomm component is used for the sideband communication channel between PRU and PTU without requiring changes to the platform's power delivery scheme. This is achieved by powering on components of the computing device in phases and allowing wireless charging registration to complete before powering up the rest of the platform components. In this way, wireless charging registration can be performed effectively in situations wherein the battery may be low and/or the device powered off, while also avoiding the need for a redundant Bluetooth or other communication component for sideband communication during wireless charging.

The techniques discussed herein may be implemented in part using a wireless charging standard protocol, such as a specification provided by Alliance For Wireless Power (A4WP), Wireless Power Consortium (WPC), and others. However, the techniques described herein may be implemented using any other wireless charging standard protocol where applicable.

FIG. 1 is block diagram of a PTU to provide power to a PRU. A PTU 102 may be coupled to a PRU 104 via magnetic inductive coupling between resonators 106 and 108, as indicated by the arrow 110. The resonator 106 of the PTU 102 may be referred to herein as a Tx coil 106. The resonator 108 of the PRU 104 may be referred to herein as an Rx coil 108.

The PTU 102 may include an oscillator, 112, a power amplifier 114, a Direct Current to Direct Current (DC2DC) converter 116, and a matching circuit 118. The oscillator 112 is configured to generate a periodic oscillating electronic signal at a specified frequency. The power amplifier 114 receives direct current power from the DC2DC converter 116, and amplifies the signal received from the oscillator 112. The matching circuit 118 matches the impedance of the power amplifier 114 to the impedance of the resonator 106 to ensure efficient power transmission. The matching circuit 118 may include any suitable arrangement of electrical components such as capacitors, inductors, and other circuit elements that can be adjusted to impedance match the resonator 106 to the power amplifier 114.

Other components of the PTU may include a current sensor 120, a Bluetooth Low Energy (BLE) module 122, a controller 124, and others. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 124 of the PTU 102. The controller 124 can be configured to control various aspects of the operation of the PTU 102. For example, the controller 124 can set a frequency, and/or power level of the power radiated by the resonator 106. The controller 124 can also control communications between the PTU 102 and the PRU 104 through the BLE module 122.

The PRU 104 may be a component of a computing device 126 configured to receive power from the PTU 102 wirelessly by the inductive coupling 110. The computing device 126 may be any suitable type of computing device, including a laptop computer, an Ultrabook, a tablet computer, a phablet, a mobile phone, smart phone, smart watch, and other types of mobile battery-powered devices.

The PRU 104 can include a rectifier 128, a DC2DC converter 130, a battery charger 132, and a battery 134. The computing device 126 receives electrical power as a magnetic flux associated with the inductive coupling that passes through the resonator 108. The rectifier 128 receives an alternating current (AC) voltage from the resonator 108 and generates a rectified DC voltage (Vrect). The DC2DC converter 130 receives the rectified voltage from the rectifier 128, converts the voltage to a suitable voltage level, and provides the output to the battery charger 132.

The battery 134 powers the various platform hardware 136 of the computing device 126. The platform hardware 136 includes all of the processors, working memory, data storage devices, communication buses, I/O interfaces, communication devices, display devices, and other components that make up the computing device. The platform hardware includes a multicomm unit 138, which is a consolidated, general-purpose communication device that serves as the main wireless communication platform of the computing device and is used to implement various communication standards employed by the computing device 126. For example, the multicomm unit 138 may be capable of wireless communications using any combination of Wifi, Bluetooth, Bluetooth Low Energy (BLE), 4G, LTE, and others. The multicomm unit 138 may be an integrated circuit disposed on its own separate computer chip, or the Multicomm unit may be a module of a larger integrated circuit such as a System on a Chip (SOC).

The multicomm unit 138 is also used to implement a sideband communication channel between the PTU 102 and the PRU 104. In some examples, the sideband communication channel is a BLE channel. However, it is also possible that communication standards other than BLE can be used to implement the side channel. When the PRU 104 detects the presence of wireless power from the PTU 102, a wireless power registration process can be initiated using the side channel. During the registration process, the PRU 104 informs the PTU 102 about its wireless charging capabilities, so that appropriate power levels can be chosen and authorized by the PTU 102.

The platform hardware 136 of the computing device 126 also includes a power sequence manager 140. In some situations, the computing device 126 may be powered down and have a depleted battery. If such a computing device 126 detects the availability of wireless power from the PTU 102, the computing device 126 can be powered up. Rebooting the computing device 126 using wireless power from a PTU 102 may be referred to herein as a "wireless charging cold boot." The power sequence manager 140 controls the activation of platform components, so that during a wireless charging cold boot, the multicomm unit 138 will have the power to complete the wireless charging registration and subsequent session.

When wireless energy is sensed, the platform's battery charger 132 is turned on automatically and the multicomm unit 138 is powered by wireless energy so it can execute the wireless power registration. The system uses Long Beacon Extension signaling to provide sufficient time for booting the power delivery subsystem and the multicomm device.

Additionally, the power sequence manager 140 manages the activation of additional platform components so that the allowed power budget for the computing device 126 is not exceeded during a low battery. Accordingly, the power sequence manager can temporarily suppress the activation of some platform components. Following the wireless power registration process, the power sequence manager can activate the other platform components. The power sequence manager may be implemented in various components of the platform hardware, depending on the whether the multicomm unit 138 is included in the platform's System on a Chip (not shown) or is a discrete chip, separate from the SoC. The power sequence manager can be implemented as an external PMIC (which is the platform entity responsible for the power sequence of all platform components) or as a combination of an external PMIC and an internal SoC Sequence manager (an entity in the SoC responsible for power sequencing the modules within the SoC). Examples of such implementations of the power sequence manager 140 are described in FIGS. 2 and 4.

In some cases, a handshaking algorithm is implemented between the multicomm unit 138 and the power sequence manager 140 to guarantee that the computing device platform does not exceed the allowed power budget during wireless power registration. As will be described further below, this algorithm uses a stall indication from the multicomm unit 138 that halts the boot process of the platform SoC until sufficient energy is available. After the multicomm device 138 completes the wireless power registration process, the multicomm device 138 de-asserts the stall indication, allowing the platform to continue with its boot sequence. This way, the system power-up sequence during a wireless charging cold boot is executed in phases to prevent powering platform components that are not yet needed.

The techniques described herein enable the computing device's multicomm unit 138 to be used for wireless power registration while at the same time preventing the computing device from exceeding its power budget during wireless charging cold boot. Accordingly, the use of a separate dedicated BLE unit dedicated to the wireless charging registration can be eliminated. Additionally, the techniques described herein take into account the constraints of the wireless charging budgets while minimizing the impact on the power delivery design of the computing device components such as the SoC and the multicomm unit.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
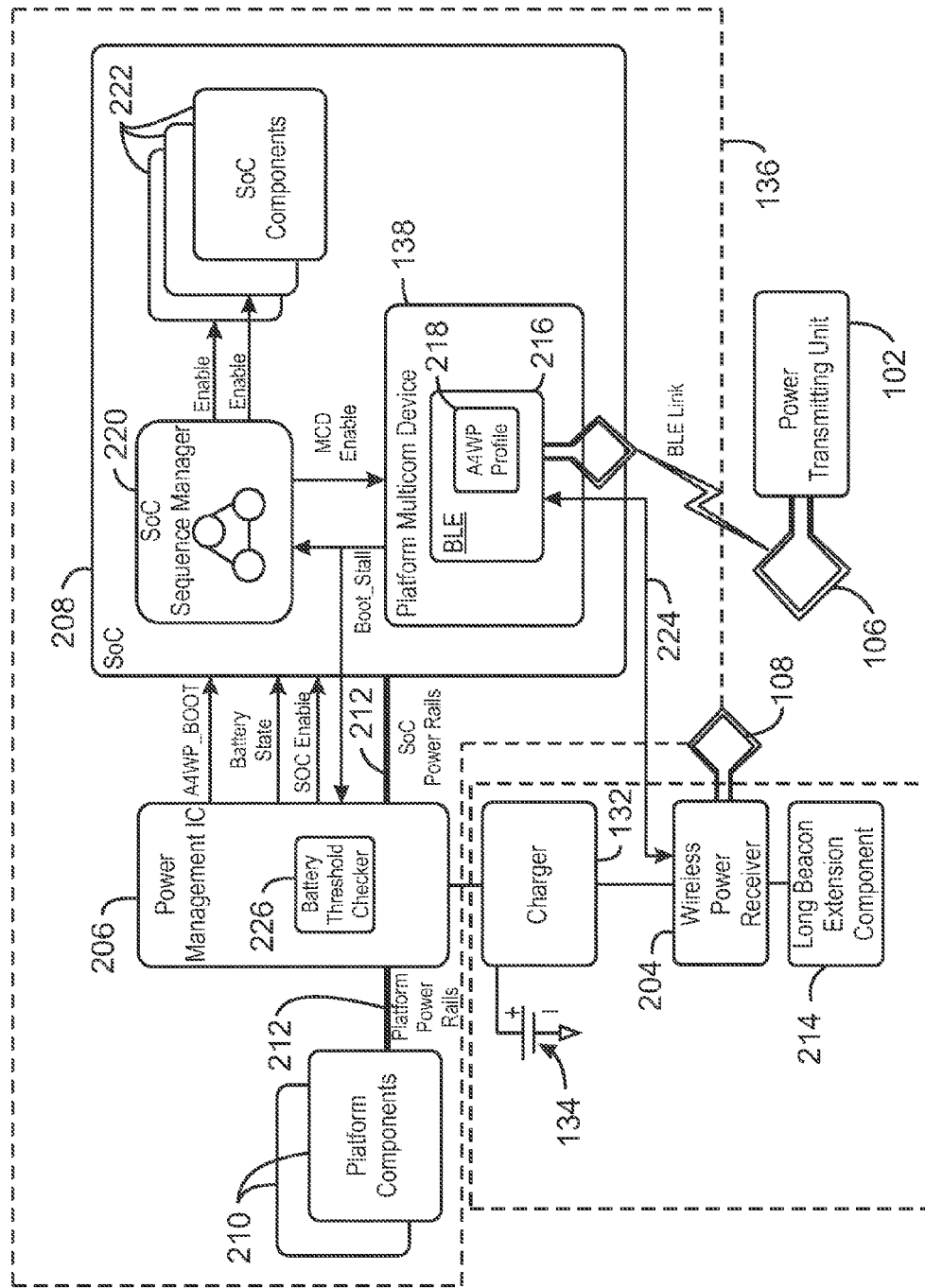
FIG. 2 is block diagram of an example system for wirelessly charging a computing device.

FIG. 2 is block diagram of an example system for wirelessly charging a computing device. The system includes the PTU 102 and the PRU 104. The PRU 104 and the platform hardware 136 may be included in a device such as the computing device 126 of FIG. 1. As shown in FIG. 2, the PRU 104 includes the battery charger 132, battery 134, and a Wireless Power Receiver (WPR) 204 coupled to the resonator 108. The Wireless Power Receiver (WPR) harvests wireless energy from the field and converts it to a DC power source that is driven into the battery charger 132.

The platform hardware 136 includes a power management Integrated circuit (IC) 206, System on a Chip (SoC) 208, and other platform components 210 such as display devices, input devices, and the like. The power management IC 206 is responsible for the power sequencing of platform's power rails 212.

In some examples, the PRU 104 also includes a Long Beacon Extension component 214, which sends signals to the PTU 102 through load modulation signaling in order to request beacon extension. Beacon extension extends the time of the beacon transmitted from the PTU 102 so that more time is available for powering up the sideband signaling (BTLE) so that the system can initiate charging. The Long Beacon Extension component 214 can also be integrated into the WPR 204.

In this example, the multicomm device is implemented as an integrated device, which is part of the platform's SoC 208 to be used as a BLE controller without requiring complex power delivery scheme within the SoC. The multicomm device 138 in this example serves both as the BLE controller 216 and as the host for the wireless charging application 218. This hosting improves user experience as it allows for a quicker "sign of life" for wireless charging while limiting the total power consumption of the platform during the A4WP registration protocol. Using the platform's multicomm device for the A4WP BLE profile also provides better co-existence with other wireless connections that may be active during wireless charging, whether they are other BLE and Bluetooth connections or WLAN traffic. The SoC 208 also includes an SoC sequence manager 220, which controls the timing of when the different SoC components 222 are enabled and serves as the power sequence manager 140 described in FIG. 1.

The wireless charging registration process starts when the computing device is placed on the PTU 102. When the PTU 102 detects an impedance change, it sends a pulse of energy that enables the WPR 204 to power-up and signal the long beacon extension request. When the long beacon extension request is detected by the PTU 102, the PTU 102 extends the period of the energy pulse. This allows powering up the charger 132, the power management IC 206 and portions of the SoC 208 as part of the wireless charging registration process. The WPR 204 continues to harvest the wireless energy and convert it into a DC voltage that is fed into the battery charger 132. The charger 132 will turn on and enable its charging output rail which would subsequently power up the power management IC and the energy subsystem of the platform that the multicomm device 138 is connected to. The power management IC 206 manages the power sequencing and is programmed to be turned on when it observes the wireless charging stimulus.

When the platform hardware 136 is placed on the charging matt, the battery 134 of the platform hardware 136 may either have enough charge in it for booting the entire platform (in which case computing device 126 can be in an ON state or OFF state) or the battery 134 may be completely depleted (in which case the computing device 126 is in OFF state). In some examples, the charger's output rail can be used both for charging the battery 134 and for directly powering up the platform components regardless of battery state (a mode sometimes referred to as power-path). In this way, the platform components 206, 208, and 210 can be powered directly from the wireless energy when the battery is depleted.

The SoC sequence manager 220 controls the timing in which the different SoC components are taken out of reset. Upon wireless energy detection the power management IC 206 powers-up, detects the wireless energy stimulus and unconditionally turns on the power rails inside the SoC 208 that are used by the multicomm unit 138. The multicomm unit 138 checks for the presence of wireless energy and starts the wireless charging registration protocol, which is executed under the limited power budget supplied by the wireless charger 132. The multicomm unit 138 may check for the presence of wireless energy using an I2C communication channel 224 with the WPR 204 or by inspecting a dedicated A4WP_BOOT signal connected from the power management IC 206 to the SoC 208. When wireless charging registration is complete the wireless charger 132 increases the power budget to a level that allows the rest of the platform components to be turned on regardless of the battery state. This operational power level is set according to the device's category as defined in, for example, in the A4WP specification. During the wireless charging registration phase, the power consumption of all enabled platform components does not exceed the power budget available for registration, which is defined to be 1.1 Watts in the A4WP specification.

In the example system shown in FIG. 2, power-up decisions may be made based on negotiation with the multicomm unit 138. This technique is referred to herein as a "closed loop" technique. In the closed-loop technique, the power management IC 206 immediately power-ups the SoC when wireless energy is detected. The power management IC 206 is programmed such that wireless charging cold boot sequence will only power the minimum set of power rails used by the multicomm unit 138 to establish a BLE connection. The power management IC 206 also signals to the SoC 208 the presence of wireless energy through the A4WP_BOOT signal. When the SoC 208 is turned on, the SoC sequence manager 220 starts running and enables a pre-defined set of SoC components including the multicomm unit 138 and private voltage rails, clocks, and any other SoC devices that are involved in operation of the multicomm unit 138. The SoC sequence manager 220 ensures the availability of those resources used by the multicomm unit 138, before enabling the multicomm unit 138. The SoC sequence manager 220 also keeps the rest of the SoC resources powered-down, thus keeping the SoC power consumption to a minimum and the overall system power within the A4WP power constrains as appear prior to connection establishment. In some examples, if the A4WP_BOOT signal is set, the sequence manager 220 can use various power and clocking strategies to further reduce the power consumption, for example, configuring certain SoC blocks to run in slow clock mode. The A4WP_BOOT indication can also be used by the computing device 136 to indicate to the user that charging activity is about to start.

The SoC sequence manager 220 implements a handshaking protocol with the multicomm unit 138 for deciding when to enable the rest of the SoC components. After the SoC sequence manager 220 takes the multicomm unit 138 out of reset (by asserting MCD_ENABLE) it shall track the status of a BOOT_STALL signal from the multicomm unit 138 that indicates if it may continue with the boot flow. Until the indication is cleared the sequence manager halts the boot operation. When the multicomm unit 138 is enabled it shall detect that wireless energy is present and start the A4WP registration process. When registration is complete the multicomm unit 138 indicates to the sequence manager that it may be possible to continue with the boot process and power up the rest of the SoC components by clearing the BOOT_STALL indication. When clearing the BOOT_STALL indication the multicomm unit 138 can also provide to the sequence manager the A4WP registration results and the available power budget that has been negotiated with the PTU 102. The SoC sequence manager 220 and power management IC 206 can use this information for deciding how to proceed with the boot flow. This handshaking ensures that the platform's power consumption during the A4WP registration phase does not exceed the available power budget.

The power management IC 206 may also include a battery threshold checker 226 that determines the charge level of the battery 134. The power management IC 206 can determine a battery state, which indicates whether the battery charge level is above a specified threshold that indicates a sufficient charge for booting the SoC 208 regardless of the wireless energy received from the PTU 102. The battery state can be communicated to the SoC 208. In some examples, the SoC sequence manager 220 can ignore the boot stall indication if the battery state indicates that the battery charge is above the threshold that allows booting the SoC 208 regardless of wireless energy levels.

It is to be understood that the block diagram of FIG. 2 is not intended to indicate that the system 200 is to include all of the components shown in FIG. 2. Rather, the system 200 can include fewer or additional components not illustrated in FIG. 2.

Figure 3:
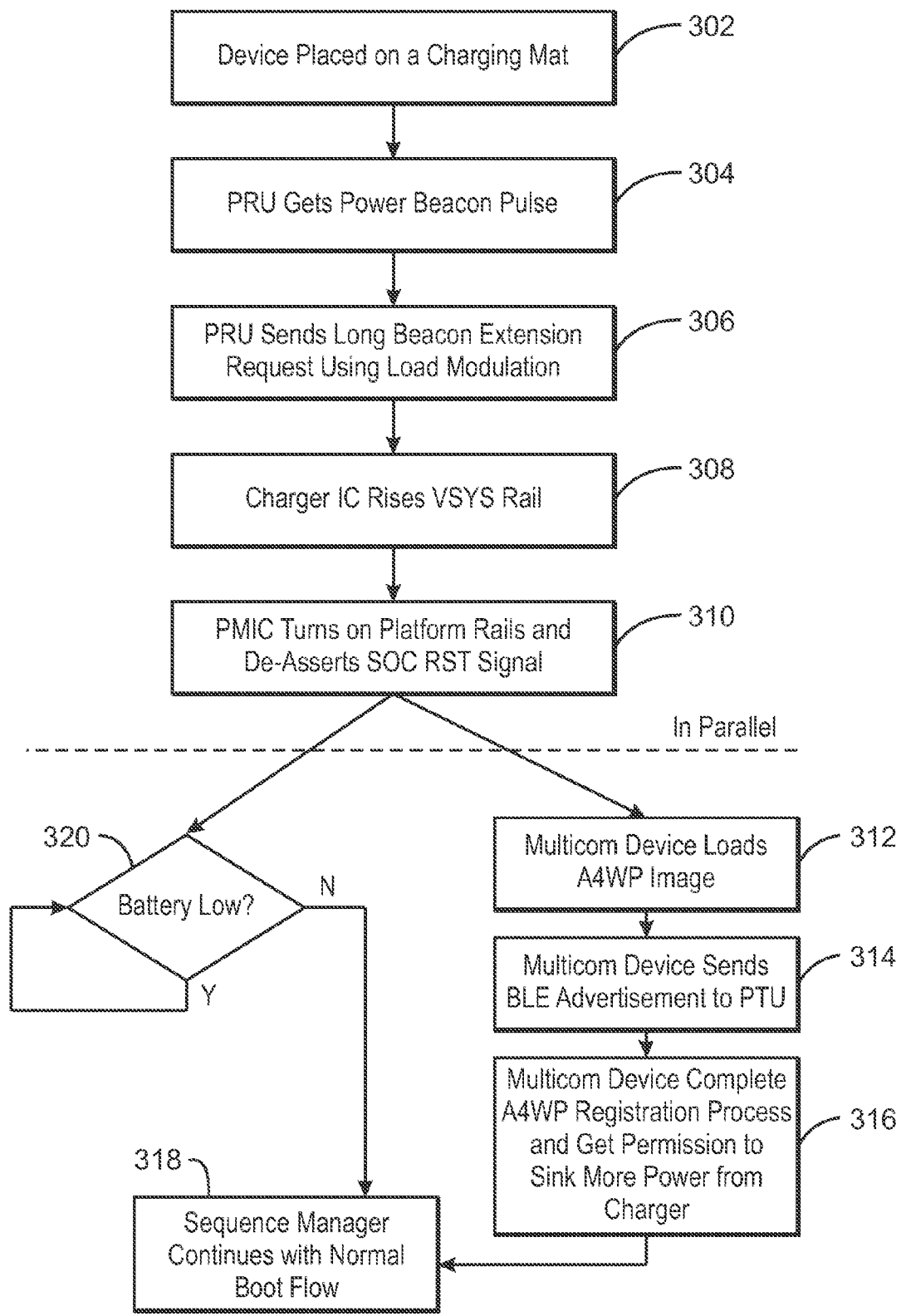
FIG. 3 is a process flow diagram showing an example method of controlling a computing device that includes a wireless power receiver.

FIG. 3 is a process flow diagram showing an example method of controlling a computing device that includes a wireless power receiver. The method 300 may be performed by the system 200 shown in FIG. 2. The logic for performing the processed described below may be embodied in hardware, such as logic circuitry or one or more processors configured to execute instructions stored in a non-transitory, computer-readable medium.

The method may begin at block 302, at which time the computing device 126 is placed on a charging mat. At block 304, the PRU 104 receives a power beacon pulse. At block 306, in response to the power beacon pulse, the PRU 104 sends the long beacon extension request the PTU 102 using load modulation signaling, for example. In some examples, sending the long beacon extension request may be conditioned on the charge level of the battery being too low. In other words, in some examples, the long beacon extension request may be sent if the charge level is below a threshold level, and block 306 may be skipped if the charge level is above the threshold level. At block 308, the charger 132 turns on the Vsys rail, which powers the power management IC 206. At block 310, the power management IC 206 turns on the platform rails for powering the SoC 208 and de-asserts the SoC reset signal, which prevents the SoC from booting up. Also at block 310, the A4WP_boot signal from the power management IC 206 is asserted, which allows the multicomm device 138 to boot up. From block 310, the process flow advances to blocks 312 and block 320 in parallel.

At block 312, the multicomm device 138 loads the wireless charging application (e.g., A4WP image), which is used to run the wireless charging registration process. At block 314, the multicomm device 138, under the control of the wireless charging application, sends BLE advertisements to the PTU 102. At block 316, the multicomm device 138 completes the wireless charging registration process and the PTU 102 begins transmitting more power to the PRU 104.

At block 318, the SoC sequence manager 220 continues with the normal boot flow. More specifically with reference to FIG. 2, the boot stall signal from the multicomm device 138 may be de-asserted and the SoC enable signal from the power management IC 206 is asserted.

At block 320, which is performed in parallel with blocks 312, 314, and 316, a determination is made regarding whether the battery is sufficiently charged to allow the SoC 208 to continue with a normal boot flow. The determination may be made by the SoC sequence manager 220, which polls the battery state indication from the power management IC 206. If at block 320, if the battery charge is above the threshold level, the process flow advances to block 318, regardless of whether the wireless charging registration has completed.

The method 300 should not be interpreted as meaning that the blocks are necessarily performed in the order shown. Furthermore, fewer or greater actions can be included in the method 300 depending on the design considerations of a particular implementation.

Figure 4:
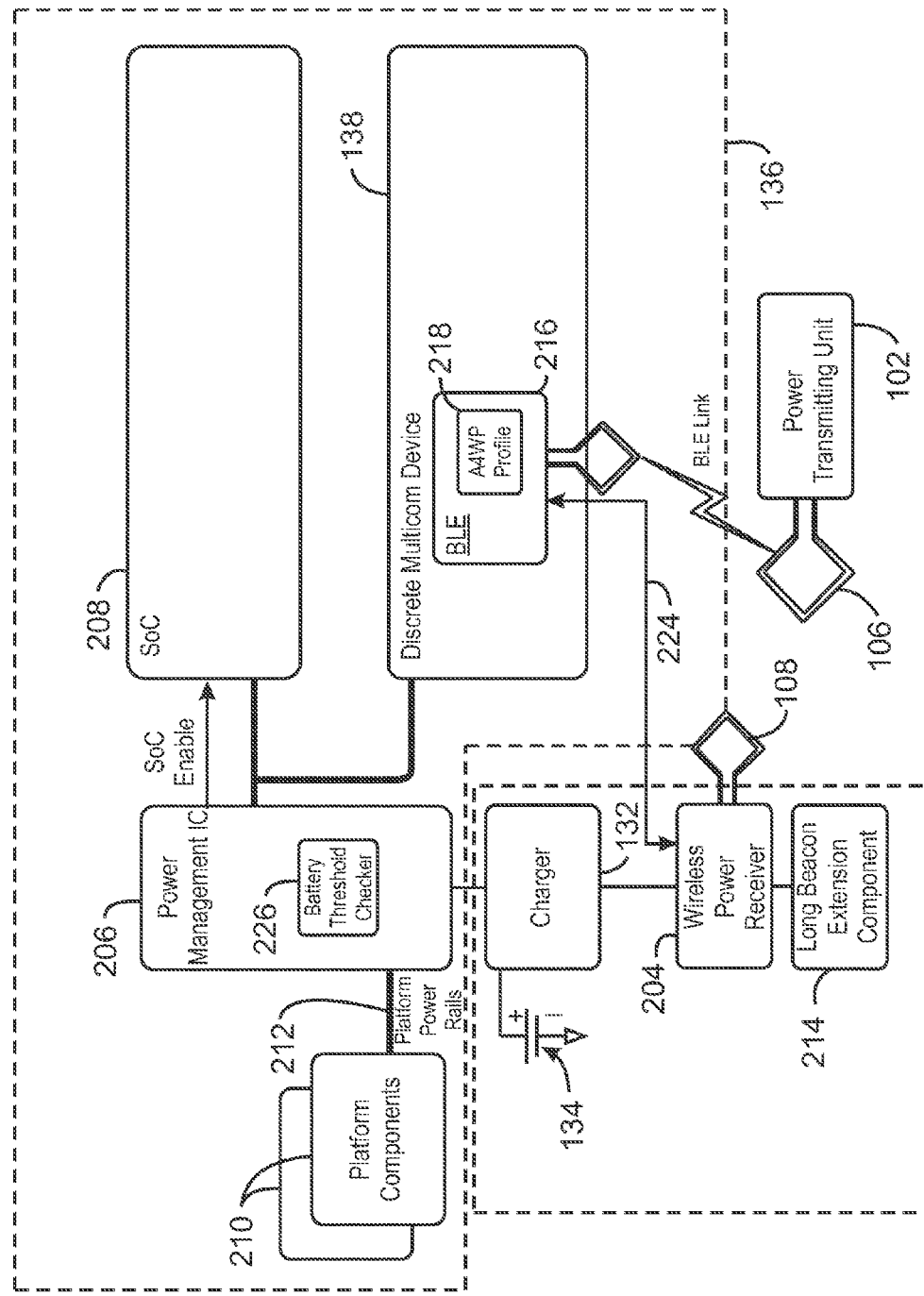
FIG. 4 is block diagram of another example system for wirelessly charging a computing device.

FIG. 4 is block diagram of another example system for wirelessly charging a computing device. The example PRU 104 of FIG. 4 includes many of the same components as described above in FIG. 2, including the battery 134, the battery charger 132, the Wireless Power Receiver (WPR) 204 coupled to the resonator 108, and the Long Beacon Extension component 214. As in FIG. 2, the computing device 136 also includes a power management Integrated circuit (IC) 206, System on a Chip (SoC) 208, and other platform components 210 such as display devices, input devices, and the like.

In this example, the multicomm device is implemented as a discrete device, which is separate from the platform's SoC 208. The multicomm device 138 in this example serves both as the BLE controller 216 and as the host for the wireless charging application 218. In this example, the power management IC 206 controls the timing of when the SoC 208 and the multicomm device 138 are enabled and serves as the power sequence manager 140 described in FIG. 1. When the SoC is enabled by the power management IC 206, the individual components of the SoC 208 may enabled in accordance with the programming of the SoC, and the SoC sequence manager 220 shown in FIG. 2 may be excluded from the design of the SoC 208.

In the example system shown in FIG. 4, power-up decisions are made by the power management IC 206 based on the charge level of the battery 134. This technique is referred to herein as an "open loop" technique. In the open-loop technique, the power management IC 206 controls the platform reset lines and the power rails for each platform device. The power management IC 206 powers-up the multicomm device 138 when wireless energy is detected even if the battery 134 is depleted. The power management IC 206 then tracks the battery level via the battery threshold checker 226. The power management IC 206 keeps the rest of the platform, including the SoC 208, in reset until the battery charge reaches a specified threshold level.

When activated, the multicomm device 138 starts the wireless power registration process. After wireless power registration is complete, part of the the wireless energy can be directed to the battery 134 and battery charging begins. Once the battery charge level is above a specified threshold, the power management IC 206 can power-up the rest of the platform rails and take the platform out of reset.

It is to be understood that the block diagram of FIG. 4 is not intended to indicate that the system 400 is to include all of the components shown in FIG. 4. Rather, the system 400 can include fewer or additional components not illustrated in FIG. 4.

Figure 5:
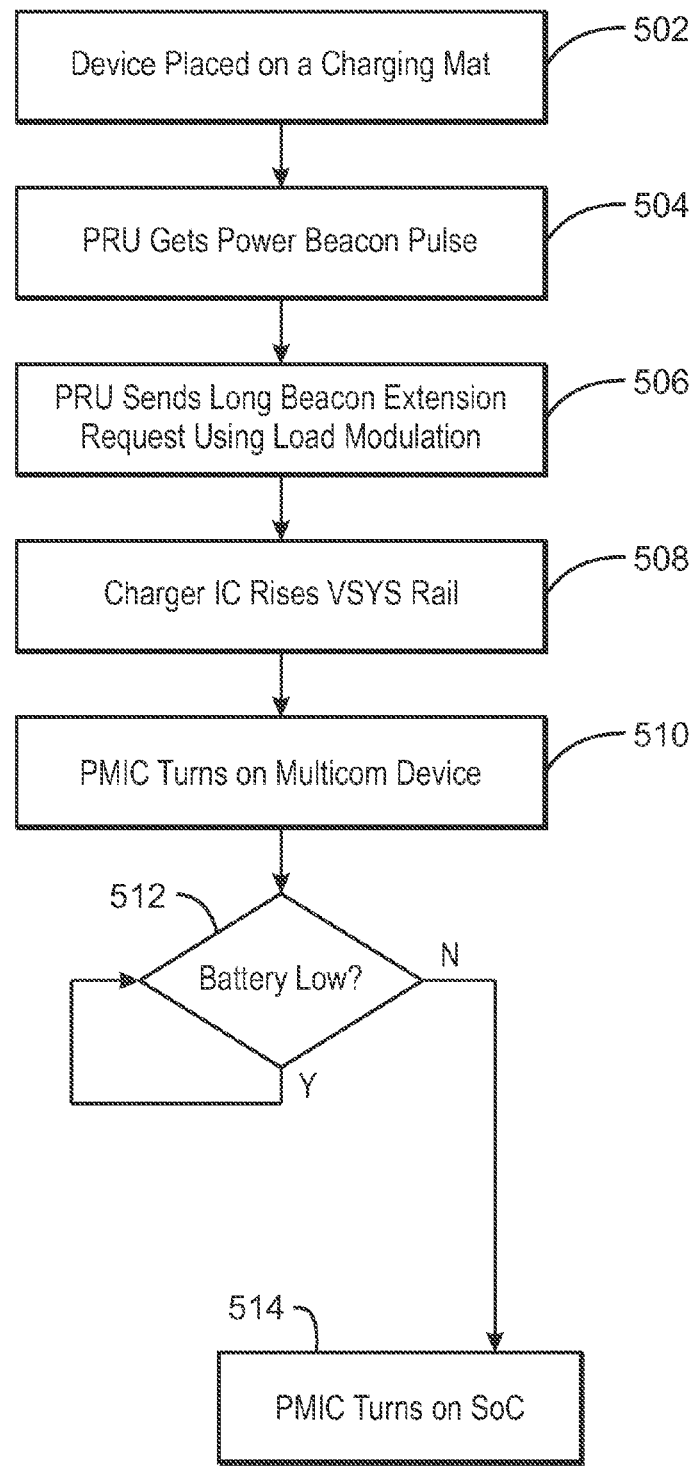
FIG. 5 is a process flow diagram showing another example method of controlling a computing device that includes a wireless power receiver.

FIG. 5 is a process flow diagram showing another example method of controlling a computing device that includes a wireless power receiver. The method 500 may be performed by the system 400 shown in FIG. 4. The logic for performing the processed described below may be embodied in hardware, such as logic circuitry or one or more processors configured to execute instructions stored in a non-transitory, computer-readable medium.

The method may begin at block 502, at which time the computing device 126 is placed on a charging mat. At block 504, the PRU 104 receives a power beacon pulse. At block 504, in response to the power beacon pulse, the PRU 104 sends the long beacon extension request the PTU 102 using load modulation signaling, for example. As explained in relation to FIG. 3, sending the long beacon extension request may, in some examples, be conditioned on the charge level of the battery being too low. At block 508, the charger 132 turns on the Vsys rail, which powers the power management IC 206. At block 510, the power management IC 206 turns on the platform rails for powering the multicomm device 138 and asserts the A4WP_boot signal, which powers up and activates the mutlicom device 138. The process flow then advances to block 512 while the multicomm device 138 performs the wireless charging registration process.

At block 512, a determination is made regarding whether the battery is sufficiently charged to allow the SoC 208 to continue with a normal boot flow. The determination may be made by the power management IC 206 via the battery threshold checker 226. If at block 512, if the battery charge is above the threshold level, the process flow advances to block 514.

At block 514, the power management IC 206 powers up and turns on the SoC 208. More specifically with reference to FIG. 4, the power rails of the SoC 208 are powered and the SoC enable signal from the power management IC 206 is asserted. The SoC 206 then performs the full boot up procedure. The other platform components 210 may also be powered up at this time.

The method 500 should not be interpreted as meaning that the blocks are necessarily performed in the order shown. Furthermore, fewer or greater actions can be included in the method 500 depending on the design considerations of a particular implementation.

Figure 6:
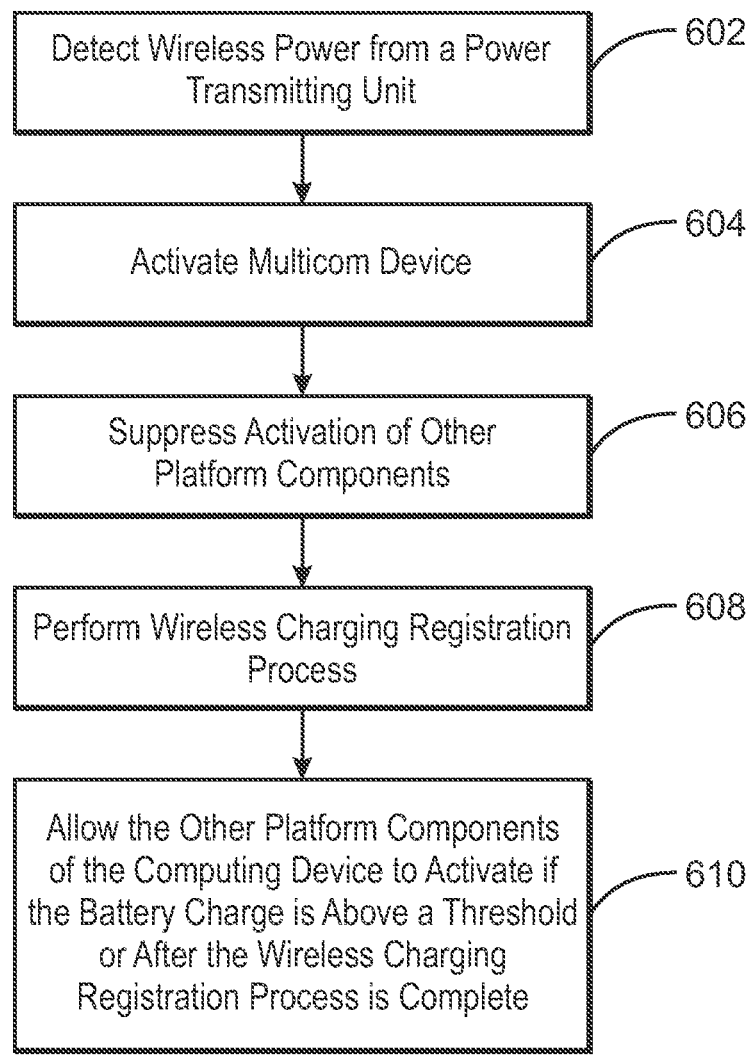
FIG. 6 is a process flow diagram summarizing an example of a method of controlling a computing device with a wireless charging receiver.

FIG. 6 is a process flow diagram summarizing an example of a method of controlling a computing device with a wireless charging receiver. The method 600 may be performed by the computing device 126 shown in FIGS. 1, 2, and 4. The logic for performing the processed described below may be embodied in hardware, such as logic circuitry or one or more processors configured to execute instructions stored in a non-transitory, computer-readable medium.

At block 602, wireless power from a power transmitting unit is detected. At block 604, the computing device's multicomm device is activated. The multicomm device may be part of the computing device's SoC as in FIG. 2, or the multicomm device may be a discrete component. If the multicomm device is included in a System on a Chip, activating the multicomm device may include turning on the power rails within the SoC that power the multicomm device and sending a signal to the multicomm device to boot up.

At block 606, the activation of other platform components is suppressed, including the SoC or parts of the SoC as well as other platform components. If the multicomm device is included in a System on a Chip, suppressing the activation of other platform components may include sending a boot stall signal from the multicomm device to a sequence manager included in the SoC. In this example, the sequence manager manages the activation of the other platform components that are included in the SoC. If the multicomm device is a discrete computer chip separate from the SoC, the activation of other platform components may be controller by power management IC of the computing device based on a charge level of a battery.

At block 608 the multicomm device performs a wireless charging registration process with the power transmitting unit. The multicomm device uses one of the communication channels as a side channel to the power transmitting unit. For example, the side channel may be implemented through a BLE module of the multicomm device.

At block 608, the remaining platform components are activated. The activation of the other platform components may be in response to the completion of the wireless charging registration process or in response to a determination that the battery is above a threshold level that indicates that the battery charge is sufficient to power the entire computing device.

The method 600 should not be interpreted as meaning that the blocks are necessarily performed in the order shown. Furthermore, fewer or greater actions can be included in the method 600 depending on the design considerations of a particular implementation.

EXAMPLES

Example 1 is a computing device with a wireless power receiver. The computing device includes a power receiving unit to wirelessly receive power from a power transmitting unit; and platform hardware including: a System on a Chip (SoC); a multicomm device to enable wireless communication via two or more communication standards, wherein one of the two or more communication standards is used as a side channel for communicating with the power transmitting unit; and a power sequence manager to manage activation of platform components during a low battery cold boot condition; wherein, upon detecting wireless power, the multicomm device is to be automatically activated and the power sequence manager is to suppress activation of other platform components.

Example 2 includes the computing device of example 1, including or excluding optional features. In this example, the multicomm device is the main wireless communication platform for the computing device.

Example 3 includes the computing device of any one of examples 1 to 2, including or excluding optional features. In this example, the multicomm device is to complete a registration process with the power transmitting unit and, after the registration process, enable the power sequence manager to activate the other platform components.

Example 4 includes the computing device of any one of examples 1 to 3, including or excluding optional features. In this example, the power sequence manager includes a power management integrated circuit (IC) coupled to the SoC and the multicomm device. Optionally, upon detection of wireless power, the power management (IC) is to be activated and the power management (IC) is to activate the multicomm device and suppresses activation of the SoC. Optionally, the power management (IC) is to monitor a battery of the computing device and activate the SoC when a charge on the battery is above a specified threshold.

Example 5 includes the computing device of any one of examples 1 to 4, including or excluding optional features. In this example, the multicomm device is included in the SoC.

Example 6 includes the computing device of any one of examples 1 to 5, including or excluding optional features. In this example, the power sequence manager includes a sequence manager included in the SoC, the sequence manager to activate the multicomm device, the multicomm device to suppress activation of other SoC components until after the multicomm device completes a wireless power registration process. Optionally, the sequence manager is to receive a battery state indicator, and the sequence manager is to activate the other SoC components if the battery state indicator indicates that a battery charge is above a threshold regardless of whether the multicomm device has completed the wireless power registration process.

Example 7 includes the computing device of any one of examples 1 to 6, including or excluding optional features. In this example, the power receiving unit includes a long beacon extension unit to send a long beacon extension request to the power transmitting unit.

Example 8 is a method of operating a computing device with a wireless power receiver. The method includes detecting wireless power from a power transmitting unit; activating a multicomm device of the computing device, wherein the multicomm device is a general purpose wireless communication platform for the computing device; suppressing activation of other platform components; performing, via a communication channel provided by the multicomm device, a wireless charging registration process; and after the wireless charging registration process is complete, allowing the other platform components of the computing device to activate.

Example 9 includes the method of example 8, including or excluding optional features. In this example, the multicomm device is included in a System on a Chip (SoC), and activating the multicomm device upon a wireless charging cold boot includes turning on a minimal set of power rails and a power optimized set of resources. Optionally, suppressing activation of other platform components includes sending a boot stall signal from the multicomm device to a sequence manager included in the SoC, and the sequence manager is to manage the activation of the other platform components. Optionally, the method includes determining a status of a battery; and activating the other platform components of the computing device if a charge level of the battery is above a threshold regardless of the boot stall signal.

Example 10 includes the method of any one of examples 8 to 9, including or excluding optional features. In this example, the multicomm device is a discrete computer chip separate from an SoC of the computing device, and wherein the other platform components are activated by a power management IC of the computing device based on a charge level of a battery.

Example 11 is a system for receiving wireless power. The system includes a computing device including a System on a Chip (SoC); a power management Integrated Circuit (IC); a multicomm device separate from the SoC, wherein the multicomm device is general purpose communication device that serves as the main communication platform of the computing device and includes a Bluetooth Low Energy (BLE) module; and a wireless power receiver to detect wireless power and, in response, activate the power management IC; wherein, upon activation, the power management IC is to activate the multicomm device and suppress activation of the SoC.

Example 12 includes the system of example 11, including or excluding optional features. In this example, the power management IC is to monitor a charge level of a battery and activate the SoC when the battery level is above a threshold.

Example 13 includes the system of any one of examples 11 to 12, including or excluding optional features. In this example, upon activation of the multicomm device, the multicomm device is to perform a wireless charging registration process using the BLE module as a side channel for communication with a power transmitting unit. Optionally, the wireless charging registration process is in accordance with an Alliance For Wireless Power (A4WP) wireless charging protocol.

Example 14 includes the system of any one of examples 11 to 13, including or excluding optional features. In this example, the wireless power receiver is to issue a long beacon extension request using load modulation of the wireless power receiver.

Example 15 is a system for receiving wireless power. The system includes a computing device including a System on a Chip (SoC), the SoC including a sequence manager and a multicomm device which is general purpose communication device that serves as the main communication platform of the computing device and includes a Bluetooth Low Energy (BLE) module; a power management Integrated Circuit (IC); and a wireless power receiver to detect wireless power and, in response, activate the power management IC; wherein, upon activation, the power management IC is to activate the multicomm device, and the multicomm device is to suppress activation of other components of the SoC.

Example 16 includes the system of example 15, including or excluding optional features. In this example, upon activation of the multicomm device, the multicomm device is to perform a wireless charging registration process using the BLE module as a side channel for communication with a power transmitting unit. Optionally, the wireless charging registration process is in accordance with an Alliance For Wireless Power (A4WP) wireless charging protocol. Optionally, the multicomm device issues a boot stall indication to the sequence manager which is to prevent the SoC from completing a full boot of the SoC, and the multicomm device is to de-assert the boot stall indication after the wireless charging registration process has completed.

Example 17 includes the system of any one of examples 15 to 16, including or excluding optional features. In this example, the power management IC is to monitor a charge level of a battery and activate a full boot if the SoC if the battery level is above a threshold.

Example 18 is an apparatus for operating a computing device with a wireless power receiver. The apparatus includes means for detecting wireless power from a power transmitting unit; means for activating a multicomm device of the computing device, wherein the multicomm device is a general purpose wireless communication platform for the computing device; means for suppressing activation of other platform components; means for performing, via a communication channel provided by the multicomm device, a wireless charging registration process; and means for allowing the other platform components of the computing device to activate after the wireless charging registration process is complete.

Example 19 includes the apparatus of example 18, including or excluding optional features. In this example, the multicomm device is included in a System on a Chip (SoC), and the means for activating the multicomm device upon a wireless charging cold boot includes means for turning on a minimal set of power rails and a power optimized set of resources. Optionally, the means for suppressing activation of other platform components includes means for sending a boot stall signal from the multicomm device to a sequence manager included in the SoC, the sequence manager to manage the activation of the other platform components. Optionally, the apparatus includes means for determining a status of a battery; and means for activating the other platform components of the computing device if a charge level of the battery is above a threshold regardless of the boot stall signal.

Example 20 includes the apparatus of any one of examples 18 to 19, including or excluding optional features. In this example, the multicomm device is a discrete computer chip separate from an SoC of the computing device, and wherein the means for activating the other platform components of the computing device are to activate the other platform components based on a charge level of a battery.

Example 21 is a computing device with a wireless power receiver. The computing device includes a System on a Chip (SoC); a multicomm device to enable wireless communication via two or more communication standards, wherein one of the two or more communication standards is used as a side channel for communicating with a power transmitting unit; and one or more processors configured to execute computer-readable instructions, the computer-readable instructions, when executed, to direct the processor to: in response to a detection of wireless power, activate the multicomm device and perform wireless power registration with the power transmitting unit; and at the start of wireless power registration, suppress activation of other platform components of the computing device.

Example 22 includes the computing device of example 21, including or excluding optional features. In this example, the multicomm device is the main wireless communication platform for the computing device.

Example 23 includes the computing device of any one of examples 21 to 22, including or excluding optional features. In this example, the instructions are to direct the one or more processors to activate the other platform components after the wireless power registration is complete.

Example 24 includes the computing device of any one of examples 21 to 23, including or excluding optional features. In this example, the one or more processors include a power management integrated circuit (IC) coupled to the SoC and the multicomm device. Optionally, the instructions are to direct the power management IC to, upon detection of wireless power, activate the multicomm device and suppresses activation of the SoC. Optionally, the instructions are to direct the power management (IC) to monitor a battery of the computing device and activate the SoC when a charge on the battery is above a specified threshold.

Example 25 includes the computing device of any one of examples 21 to 24, including or excluding optional features. In this example, the multicomm device is included in the SoC.

Example 26 includes the computing device of any one of examples 21 to 25, including or excluding optional features. In this example, the instructions are to direct the one or more processors to activate the multicomm device upon detection of wireless power, and the multicomm device is to suppress activation of other SoC components until after the multicomm device completes a wireless power registration process. Optionally, the instructions are to direct the one or more processors to activate the other SoC components if a battery state indicator indicates that a battery charge is above a threshold regardless of whether the multicomm device has completed the wireless power registration process.

Example 27 includes the computing device of any one of examples 21 to 26, including or excluding optional features. In this example, the instructions are to direct the one or more processors to send a long beacon extension request to the power transmitting unit.

Example 28 is an apparatus with a wireless power receiver. The apparatus includes a System on a Chip (SoC); a multicomm device to enable wireless communication via two or more communication standards, wherein one of the two or more communication standards is used as a side channel for communicating with a power transmitting unit; and means for, in response to a detection of wireless power, activating the multicomm device and perform wireless power registration with the power transmitting unit; and means for, at the start of wireless power registration, suppressing activation of other platform components of the apparatus.

Example 29 includes the apparatus of example 28, including or excluding optional features. In this example, the multicomm device is the main wireless communication platform for the apparatus.

Example 30 includes the apparatus of any one of examples 28 to 29, including or excluding optional features. In this example, the apparatus includes means for activating the other platform components after the wireless power registration is complete.

Example 31 includes the apparatus of any one of examples 28 to 30, including or excluding optional features. In this example, the apparatus includes a power management integrated circuit (IC) coupled to the SoC and the multicomm device. Optionally, the apparatus includes means for directing the power management IC to, upon detection of wireless power, activate the multicomm device and suppresses activation of the SoC. Optionally, the apparatus includes means for directing the power management (IC) to monitor a battery of the apparatus and activate the SoC when a charge on the battery is above a specified threshold.

Example 32 includes the apparatus of any one of examples 28 to 31, including or excluding optional features. In this example, the multicomm device is included in the SoC.

Example 33 includes the apparatus of any one of examples 28 to 32, including or excluding optional features. In this example, the apparatus includes means for activating the multicomm device upon detection of wireless power, and the multicomm device is to suppress activation of other SoC components until after the multicomm device completes a wireless power registration process. Optionally, the apparatus includes means for activating the other SoC components if a battery state indicator indicates that a battery charge is above a threshold regardless of whether the multicomm device has completed the wireless power registration process.

Example 34 includes the apparatus of any one of examples 28 to 33, including or excluding optional features. In this example, the apparatus includes means for sending a long beacon extension request to the power transmitting unit.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device with a wireless power receiver, comprising:
a power receiving unit to wirelessly receive power from a power transmitting unit; and
a platform hardware comprising:
a System on a Chip (SoC);
a multicomm device for wireless communication with two or more communication standards, wherein one of the two or more communication standards is used as a side channel for communicating with the power transmitting unit; and
a power sequence manager component to manage activation of platform components of the platform hardware during a low battery cold boot condition;
wherein, upon detecting wireless power, the multicomm device is configured to automatically activate and the power sequence manager component is configured to suppress activation of other platform components of the platform hardware.

2. The computing device of claim 1, wherein the multicomm device is a main wireless communication platform for the computing device.

3. The computing device of claim 1, wherein the multicomm device is configured to complete a registration process with the power transmitting unit and, after the registration process, enable the power sequence manager component to activate the other platform components.

4. The computing device of claim 1, wherein the power sequence manager component comprises a power management integrated circuit (IC) coupled to the SoC and the multicomm device.

5. The computing device of claim 4, wherein, upon detection of wireless power, the power management IC is activated and the power management IC activates the multicomm device and suppresses activation of the SoC.

6. The computing device of claim 5, wherein the power management IC is configured to monitor a battery of the computing device and activate the SoC when a charge on the battery is above a specified threshold.

7. The computing device of claim 1, wherein the multicomm device is included in the SoC.

8. The computing device of claim 1, wherein the power sequence manager comprises a sequence manager included in the SoC, the sequence manager is configured to activate the multicomm device, the multicomm device is configured to suppress activation of other SoC components until after the multicomm device completes a wireless power registration process.

9. The computing device of claim 8, wherein the sequence manager is configured to receive a battery state indicator to activate the other SoC components if the battery state indicator indicates that a battery charge is above a threshold regardless of whether the multicom device has completed the wireless power registration process.

10. The computing device of claim 1, wherein the power receiving unit comprises a long beacon extension unit configured to send a long beacon extension request to the power transmitting unit.

11. A method of operating a computing device with a wireless power receiver, comprising:
detecting wireless power from a power transmitting unit;
activating a multicom device of the computing device, wherein the multicomm device is a general purpose wireless communication platform for the computing device;
suppressing activation of other platform components;
performing, with a communication channel provided by the multicomm device, a wireless charging registration process; and
after the wireless charging registration process is complete, allowing the other platform components of the computing device to activate.

12. The method of claim 11, wherein the multicomm device is included in a System on a Chip (SoC), and wherein activating the multicomm device upon a wireless charging cold boot comprises turning on a minimal set of power rails and a power optimized set of resources.

13. The method of claim 12, wherein suppressing activation of other platform components comprises sending a boot stall signal from the multicomm device to a sequence manager included in the SoC, the sequence manager to manage the activation of the other platform components.

14. The method of claim 13, comprising:
determining a status of a battery; and
activating the other platform components of the computing device if a charge level of the battery is above a threshold regardless of the boot stall signal.

15. The method of claim 11, wherein the multicomm device is a discrete computer chip separate from an SoC of the computing device, and wherein the other platform components are activated by a power management IC of the computing device based on a charge level of a battery.

16. A system for receiving wireless power, comprising:
a computing device comprising a System on a Chip (SoC);
a power management Integrated Circuit (IC);
a multicomm device separate from the SoC, wherein the multicomm device is general purpose communication device that serves as the main communication platform of the computing device and comprises a Bluetooth Low Energy (BLE) module; and
a wireless power receiver configured to detect wireless power and, in response, activate the power management IC;
wherein, upon activation, the power management IC is to activate the multicomm device and suppress activation of the SoC.

17. The system of claim 16, wherein the power management IC is configured to monitor a charge level of a battery and activate the SoC when the battery level is above a threshold.

18. The system of claim 16, wherein upon activation of the multicomm device, the multicomm device is to perform a wireless charging registration process using the BLE module as a side channel for communication with a power transmitting unit.

19. The system of claim 18, wherein the wireless charging registration process is in accordance with an Alliance For Wireless Power (A4WP) wireless charging protocol.

20. The system of claim 16, wherein the wireless power receiver is to issue a long beacon extension request using load modulation of the wireless power receiver.

21. A system for receiving wireless power, comprising:
a computing device comprising a System on a Chip (SoC), the SoC comprising a sequence manager and a multicomm device which is a general purpose communication device that serves as the main communication platform of the computing device and includes a Bluetooth Low Energy (BLE) module;
a power management Integrated Circuit (IC); and
a wireless power receiver configured to detect wireless power and, in response, activate the power management IC;
wherein, upon activation, the power management IC is to activate the multicomm device, and the multicomm device is to suppress activation of other components of the SoC.

22. The system of claim 21, wherein upon activation of the multicomm device, the multicomm device is to perform a wireless charging registration process using the BLE module as a side channel for communication with a power transmitting unit.

23. The system of claim 22, wherein the wireless charging registration process is in accordance with an Alliance For Wireless Power (A4WP) wireless charging protocol.

24. The system of claim 22, wherein the multicomm device is configured to issue a boot stall indication to the sequence manager to prevent the SoC from completing a full boot of the SoC, and the multicomm device is configured to de-assert the boot stall indication after the wireless charging registration process has completed.

25. The system of claim 21, wherein the power management IC is configured to monitor a charge level of a battery and activate a full boot if the SoC if the battery level is above a threshold.

* * * * *